United States Patent
Sengodan

(10) Patent No.: US 12,048,076 B2
(45) Date of Patent: Jul. 23, 2024

(54) SYSTEM AND METHOD FOR INRUSH CURRENT CONTROL WITH COMBINATIONAL LOAD DRIVE CONFIGURATION

(71) Applicant: GOODRICH CORPORATION, Charlotte, NC (US)

(72) Inventor: Rajkumar Sengodan, Namakkal (IN)

(73) Assignee: GOODRICH CORPORATION, Charlotte, NC (US)

( * ) Notice: Subject to any disclaimer, the term of this patent is extended or adjusted under 35 U.S.C. 154(b) by 203 days.

(21) Appl. No.: 17/711,895

(22) Filed: Apr. 1, 2022

(65) Prior Publication Data

US 2022/0408531 A1 Dec. 22, 2022

(30) Foreign Application Priority Data

Jun. 22, 2021 (IN) .............................. 202141027991

(51) Int. Cl.
| | |
|---|---|
| *H05B 45/30* | (2020.01) |
| *H02H 9/02* | (2006.01) |
| *H05B 45/345* | (2020.01) |
| *H05B 45/50* | (2022.01) |
| *H05B 47/25* | (2020.01) |

(52) U.S. Cl.
CPC .............. *H05B 45/50* (2020.01); *H02H 9/02* (2013.01); *H05B 45/345* (2020.01); *H05B 47/25* (2020.01)

(58) Field of Classification Search
CPC ...... H05B 45/345; H05B 45/50; H05B 47/10; H05B 47/25; H05B 45/30; H02H 9/02
See application file for complete search history.

(56) References Cited

U.S. PATENT DOCUMENTS

| | | | |
|---|---|---|---|
| 7,606,679 B1 | 10/2009 | Voicu et al. | |
| 7,911,155 B2 | 3/2011 | Kang et al. | |
| 8,339,055 B2 | 12/2012 | Zhan et al. | |
| 2009/0045759 A1 | 2/2009 | Kang et al. | |
| 2010/0109554 A1 | 5/2010 | Lecheler et al. | |
| 2020/0367338 A1* | 11/2020 | Sengodan | H05B 47/25 |

FOREIGN PATENT DOCUMENTS

| | | | |
|---|---|---|---|
| WO | WO-2004045038 A1 * | 5/2004 | ............. H02H 9/001 |
| WO | 2021026351 | 2/2021 | |

OTHER PUBLICATIONS

European Patent Office, European Search Report dated Nov. 18, 2022 in Application No. 22180452.9.

* cited by examiner

*Primary Examiner* — Jimmy T Vu
(74) *Attorney, Agent, or Firm* — SNELL & WILMER L.L.P.

(57) ABSTRACT

A system for controlling power provided to an electronic device includes a driver configured to drive the electronic device and having an on state and an off state. The system further includes a sensor configured to detect detected electrical data corresponding to electricity provided to the driver. The system further includes a controller configured to compare the detected electrical data to a threshold electrical value and to determine a fault condition in response to the detected electrical data being greater than or equal to the threshold electrical value and to turn the driver to the off state in response to the controller determining the fault condition.

16 Claims, 7 Drawing Sheets

CONTINUED ON FIG.1C

SYSTEM AND METHOD FOR INRUSH CURRENT CONTROL WITH COMBINATIONAL LOAD DRIVE CONFIGURATION

CROSS-REFERENCE TO RELATED APPLICATIONS

This application claims priority to, and the benefit of, India Patent Application No. 202141027991, filed Jun. 22, 2021 and titled "SYSTEM AND METHOD FOR INRUSH CURRENT CONTROL WITH COMBINATIONAL LOAD DRIVE CONFIGURATION," which is incorporated by reference herein in its entirety for all purposes.

FIELD

The present disclosure relates to systems and methods for controlling inrush current in light emitting diode (LED) driver circuits and for isolating faulty LED drivers.

BACKGROUND

Inrush current on switching light emitting diodes (LEDs) has become an area of focus in the lighting industry. "Inrush current" of LED drivers refers to the initial input current (having a relatively short duration) that flows into the LED driver during initial start-up to charge capacitors on the input side. Typically, current is of relatively short duration (e.g., measured in microseconds) and has an amplitude that is significantly greater than the operating or steady-state current (e.g., twice as large, 5 times larger, 10 times larger, or the like). It is desirable for this inrush current to be controlled during operation of the LED drivers.

Thus, there is a need in the art for systems and methods for controlling inrush current in LED driver circuits and for isolating faulty LED drivers.

SUMMARY

Disclosed herein is a system for controlling power provided to an electronic device. The system includes a driver configured to drive the electronic device and having an on state and an off state. The system further includes a sensor configured to detect detected electrical data corresponding to electricity provided to the driver. The system further includes a controller configured to compare the detected electrical data to a threshold electrical value and to determine a fault condition in response to the detected electrical data being greater than or equal to the threshold electrical value and to turn the driver to the off state in response to the controller determining the fault condition.

Any of the foregoing embodiments may further include a current source configured to output a constant current to the driver.

In any of the foregoing embodiments, the current source includes a variable resistor having a resistance, and the controller is further configured to adjust the resistance of the variable resistor to control an amplitude of the constant current.

Any of the foregoing embodiments may further include a second driver configured to drive a second electronic device, wherein the electronic device and the second electronic device are configured to be driven using different current values.

Any of the foregoing embodiments may further include a current source having a source transistor configured to output an inrush current, wherein the controller is further configured to control the source transistor to output the inrush current to the driver for a first period of time upon enabling the driver and to turn off the source transistor after the first period of time, the first period of time corresponding to an inrush period.

In any of the foregoing embodiments, the sensor includes a source voltage sensor and the detected electrical data corresponds to a source voltage across the source transistor.

Any of the foregoing embodiments may further include a drive switch having a drive transistor that is configured to output a steady state current, wherein the controller is further configured to control the drive transistor to output the steady state current after the first period of time, wherein the inrush current is greater than the steady state current.

In any of the foregoing embodiments, the sensor includes a drive voltage sensor and the detected electrical data corresponds to a drive voltage across the drive transistor.

In any of the foregoing embodiments, the controller is further configured to turn the driver by turning off the drive transistor.

Any of the foregoing embodiments may further include a flip flop coupled to the drive transistor and to the controller, wherein the controller is configured to turn off the drive transistor by transmitting at least one of a set or a reset signal to the flip flop.

Also disclosed is a system for controlling power provided to an electronic device. The system includes a current source having a source transistor configured to output an inrush current. The system further includes a drive switch having a drive transistor that is configured to output a steady state current. The system further includes a driver configured to drive the electronic device and having an on state and an off state. The system further includes a controller configured to: control the source transistor to output the inrush current to the driver for a first period of time upon enabling the driver, turn off the source transistor after the first period of time, the first period of time corresponding to an inrush period, and control the drive transistor to output the steady state current after the first period of time, the inrush current being greater than the steady state current.

Also disclosed is a method for controlling power provided to an electronic device. The method includes detecting, by a sensor, detected electrical data corresponding to electricity provided to a driver that is configured to drive the electronic device. The method further includes determining, by a controller, a fault condition in response to the detected electrical data being greater than or equal to a threshold electrical value. The system further includes turning, by the controller, the driver to an off state in response to determining the fault condition.

Any of the foregoing embodiments may further include controlling, by the controller, a resistance of a variable resistor in a current source to adjust an amplitude of a constant current provided to the driver.

Any of the foregoing embodiments may further include: detecting, by a second sensor, second detected electrical data corresponding to electricity provided to a second driver that is configured to drive a second electronic device; determining, by the controller, a second fault condition in response to the second detected electrical data being greater than or equal to a second threshold electrical value; and turning, by the controller, the second driver to an off state in response to determining the second fault condition, wherein the electronic device and the second electronic device are configured to be driven using different current values.

Any of the foregoing embodiments may further include: controlling, by the controller, a source transistor to output an inrush current to the driver for a first period of time upon enabling the driver; and controlling, by the controller, the source transistor to cease outputting the inrush current to the driver after the first period of time, the first period of time corresponding to an inrush period.

In any of the foregoing embodiments, detecting the detected electrical data includes detecting, by a source voltage sensor, a source voltage across the source transistor.

Any of the foregoing embodiments may further include controlling, by the controller, a drive transistor of a drive switch to output a steady state current after the first period of time, wherein the inrush current is greater than the steady state current.

In any of the foregoing embodiments, detecting the detected electrical data includes detecting, by a drive voltage sensor, a drive voltage across the drive transistor.

In any of the foregoing embodiments, turning the driver to the off state includes turning off the drive transistor.

In any of the foregoing embodiments, turning the driver to the off state includes transmitting, by the controller, at least one of a set or a reset signal to a flip flop coupled to the drive transistor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1A:
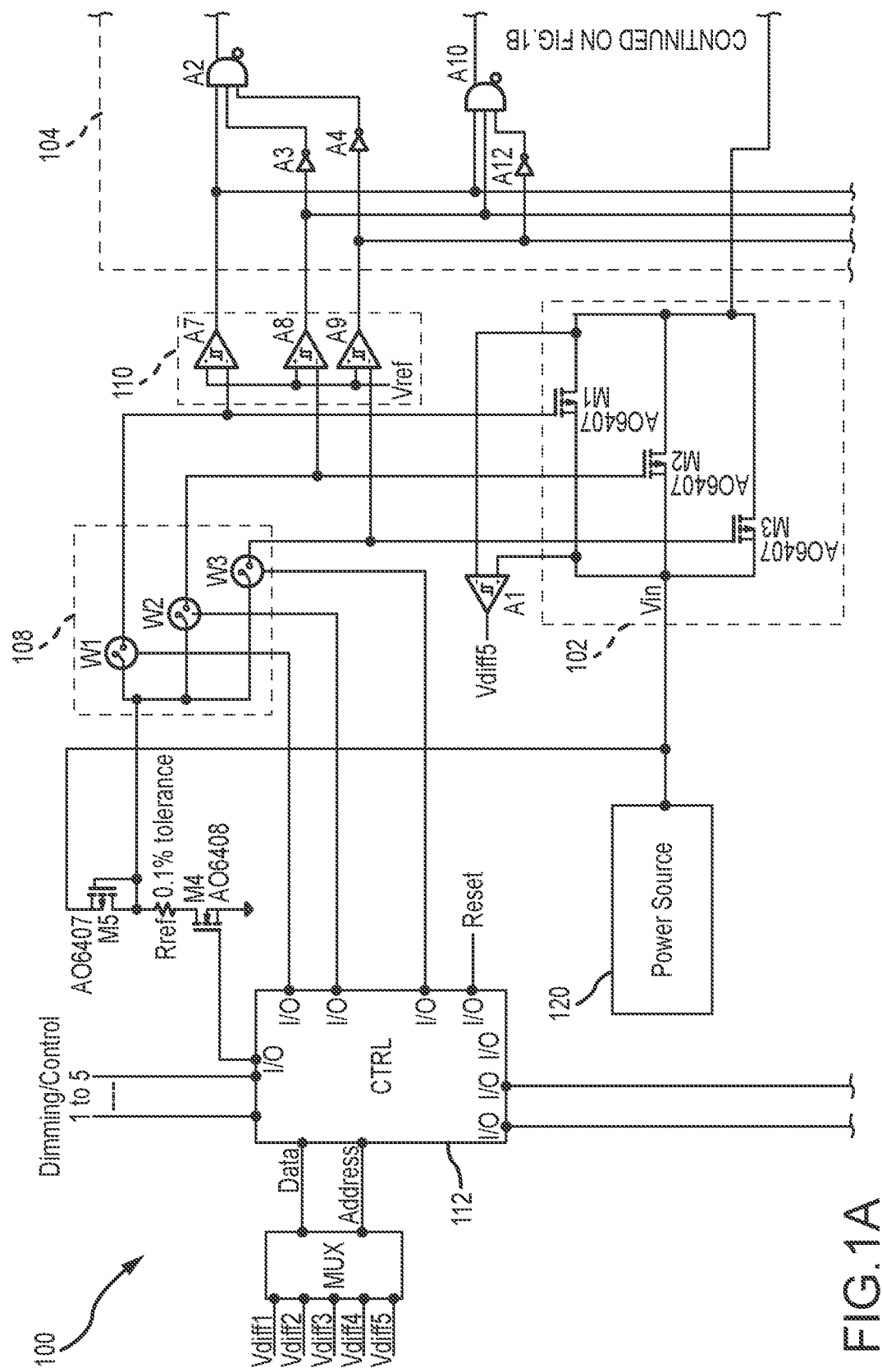
FIGS. 1A, 1B, 1C, and 1D illustrate a circuit and system for controlling inrush current in light emitting diode (LED) driver circuits and for isolating faulty LED drivers, in accordance with various embodiments.
Figure 1B:
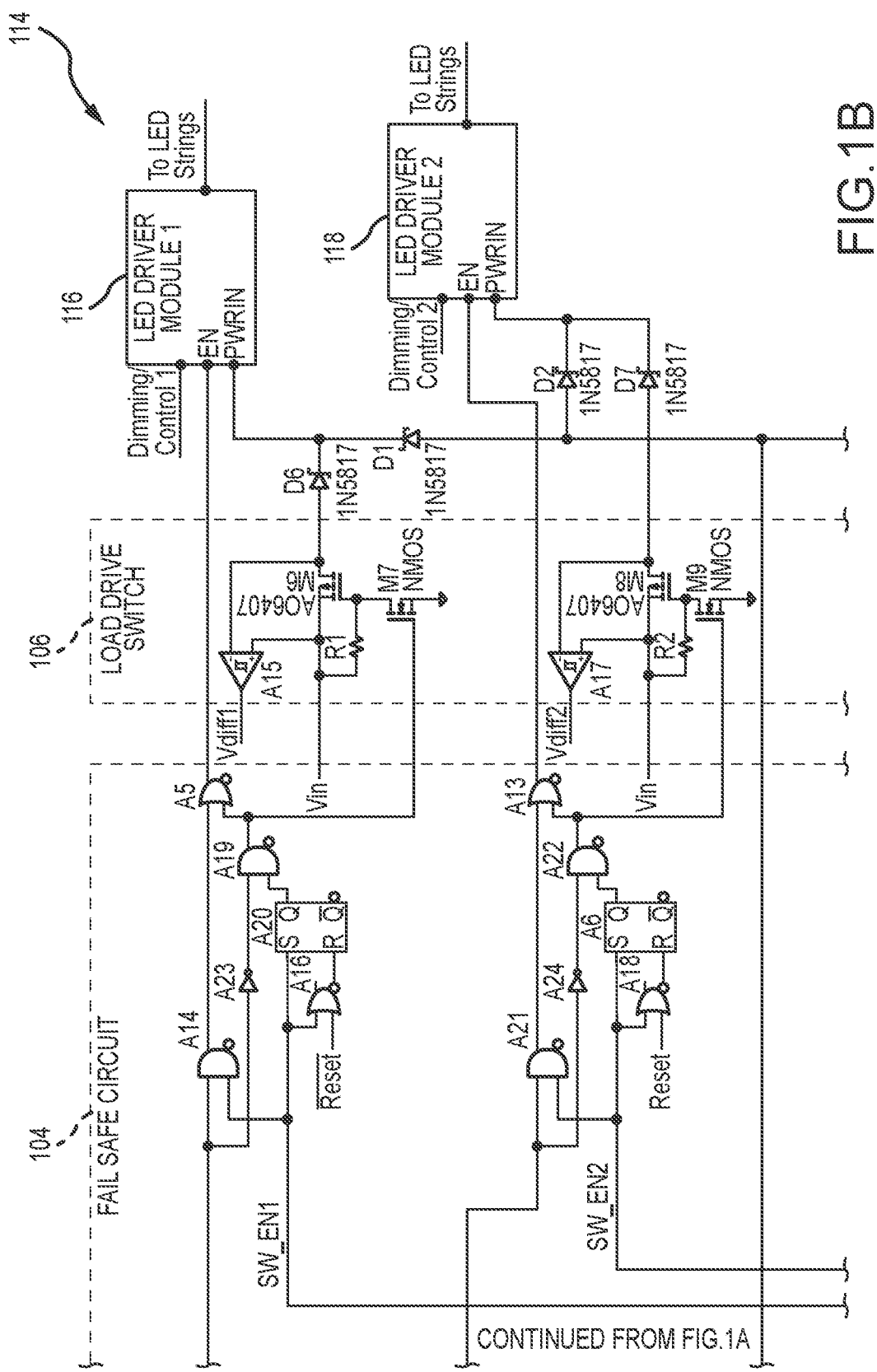
Figure 1C:
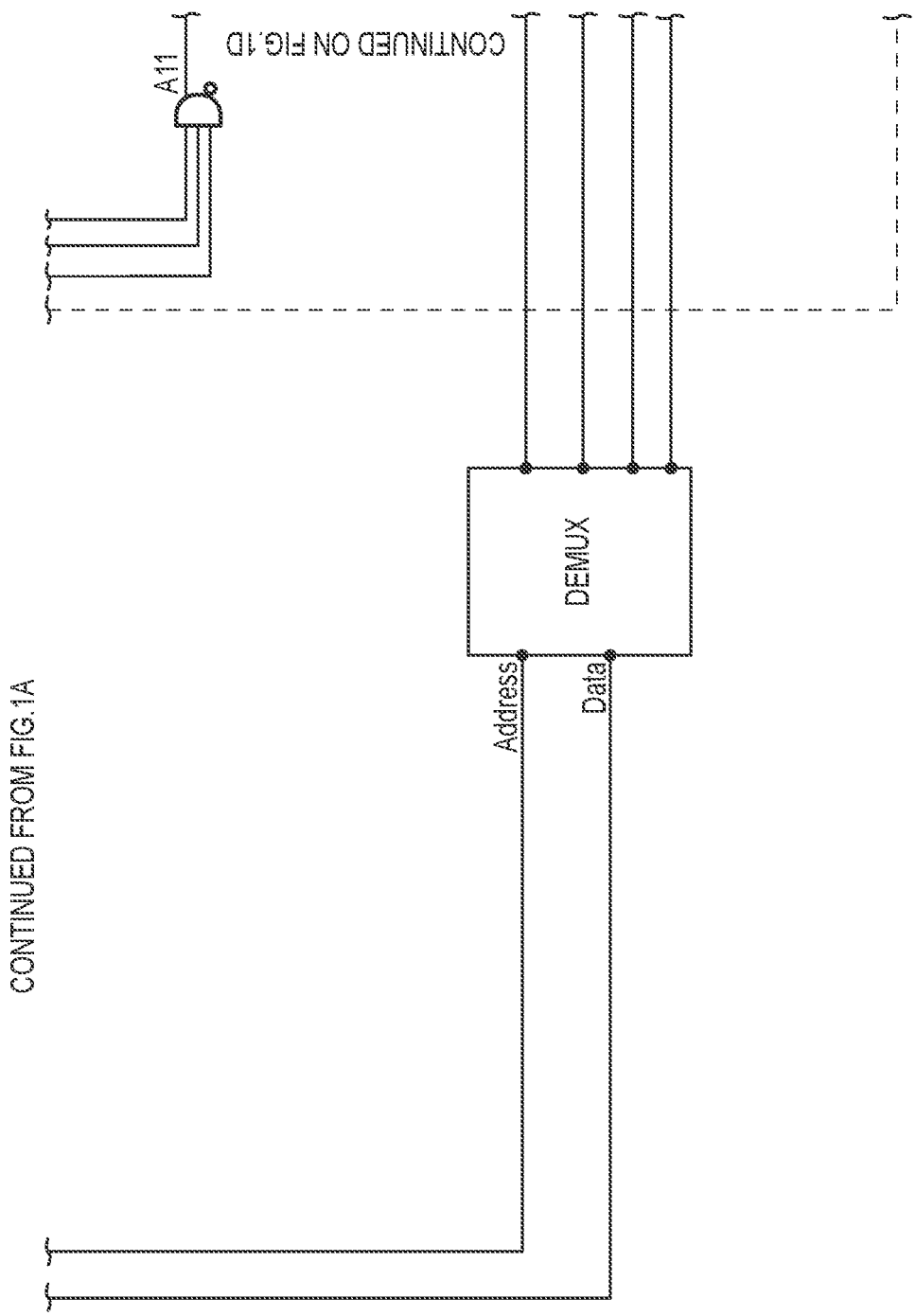
Figure 1D:
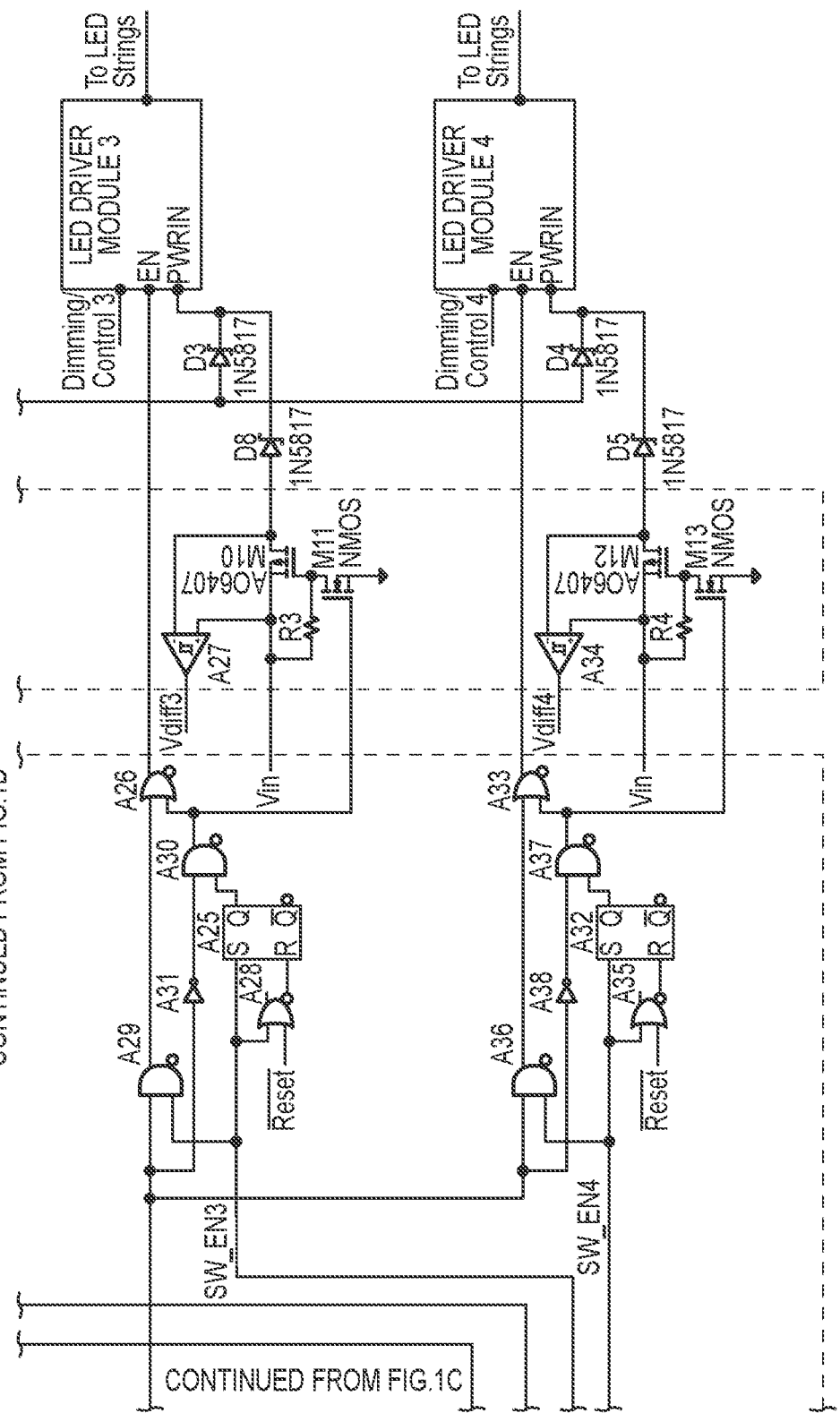

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Inrush current on switching light emitting diodes (LEDs) has become an area of concern in the lighting industry. 'Inrush current' of an LED driver refers to the input current of short duration that flows into the LED driver during initial start-up to charge capacitors on an input side of the driver. Typically, this current has a relatively short duration (e.g., microseconds or milliseconds), and has an amplitude that is significantly greater than an amplitude of an operating or steady-state current. The inrush current is due to an electromagnetic capability (EMC) filter on the input side and a bulk capacitor on the boost circuit, and is inherent with LED technology.

The proposed inrush current control architecture is designed to overcome fault occurrences in conventional LED drive modules as well as to isolate a faulty LED driver from the circuit. The LED current is accurately monitored in order to reduce the likelihood of undesirable failures that may occur in response to relatively high inrush current flowing into the drivers. The proposed system and method provides selective inrush current control in power sensitive application for LED drivers, displays, and low power electronic devices in aircraft systems, automobiles and consumer electronics.

The architecture is shown via an embodiment of LED driving circuit or system 100 which yields an LED driver with greater efficiency than existing LED drivers. The proposed topology can be configured in drive applications with multiple drivers where the power management and monitoring is significant. For driving relatively high-power or relatively low-power LEDs, a constant current method may be used to achieve consistent luminance over the operating cycle. The present disclosure, among other things and in various embodiments, solves the problem of inrush current failures in one or more LED drive configuration in which LED driving of other LEDs is uninterrupted. A detection technique is arranged to identify an under-current condition or an over-current condition and to take protective action to reduce the likelihood of a system failure and to reduce the likelihood of safety hazards.

In mass production of LED lighting devices, the possibility exists that at some point LED drivers tend to sink greater inrush current than the specified value as a result of degradation of the capacitor over time. This, in effect, tends to damage the source if not managed properly. Such an overcurrent condition may cause an electronic device failure or other undesirable result in response to electrical power being applied to the system. Such a situation is undesirable, and the proposed method will reduce the likelihood of such situations occurring for various LED drive applications. The present disclosure may be applied to any load (in place of an LED driver) to limit in-rush current.

The present disclosure provides various benefits and advantages over conventional systems. For example, conventional systems tend to measure the current level and to shut down the specific LED driver based on the current level. However, before the control loop completes its routine, the driver may experience a fatal failure due to an internal short circuit or increased inrush current. The present disclosure, on the other hand, will protect against abnormal inrush current in an active clamp configuration, followed by identification of such fault and corrective action. This method ensures preventive failure protection and isolates failed drivers from the circuit in the case of failure.

The present disclosure further provides for the seamless use and monitoring of multiple LED drivers that each operate using differing current levels. The disclosure further provides a failsafe control detection logic for LED drive control. The disclosure includes a constant current source that is enabled only during power-on events which reduces undesirable power dissipation in resistor. The disclosure provides for recording of any failure or fault events for later diagnosis.

Figure 2:
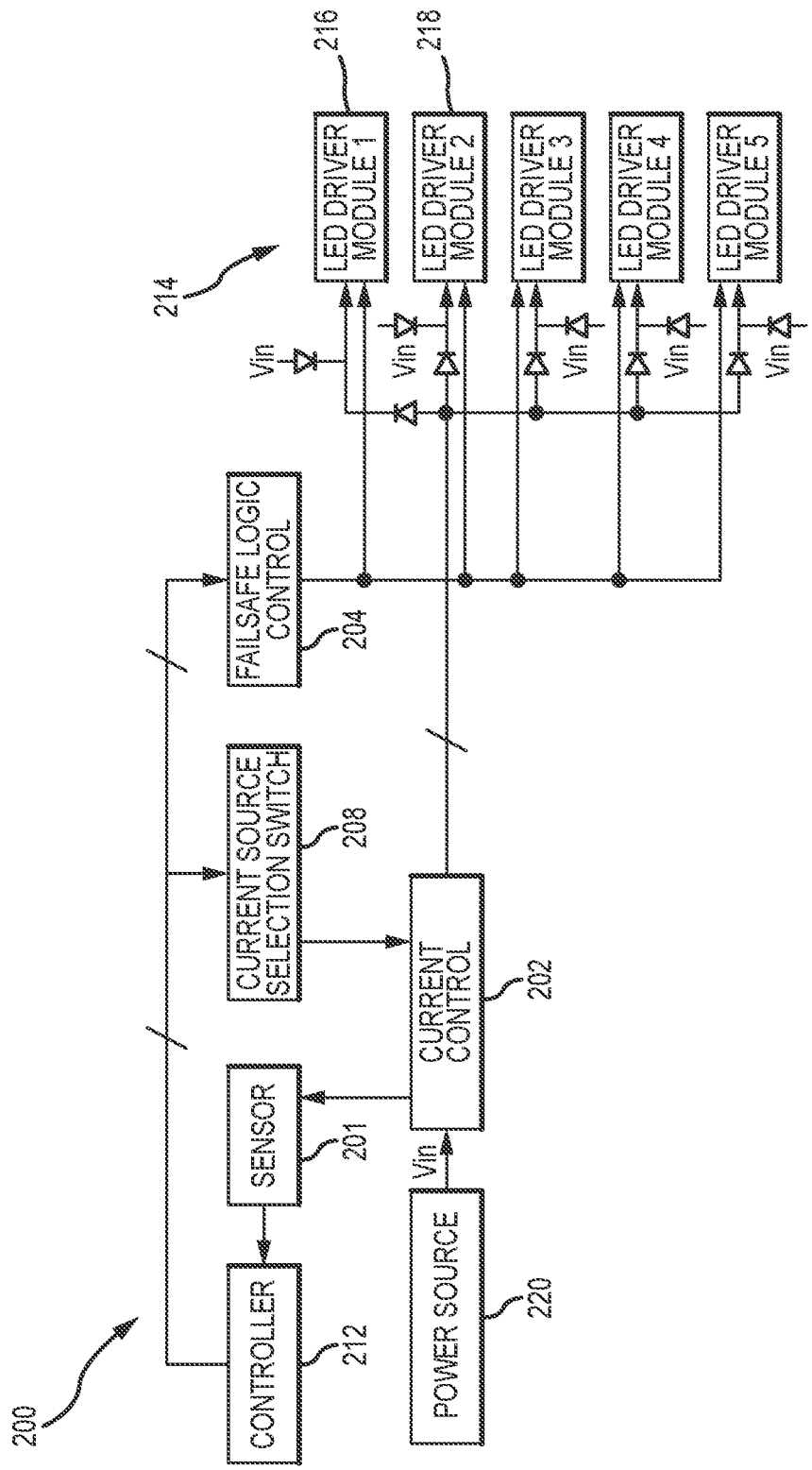
FIG. 2 illustrates a block diagram of a system for controlling inrush current in LED driver circuits and for isolating faulty LED drivers, in accordance with various embodiments.
Figure 3:
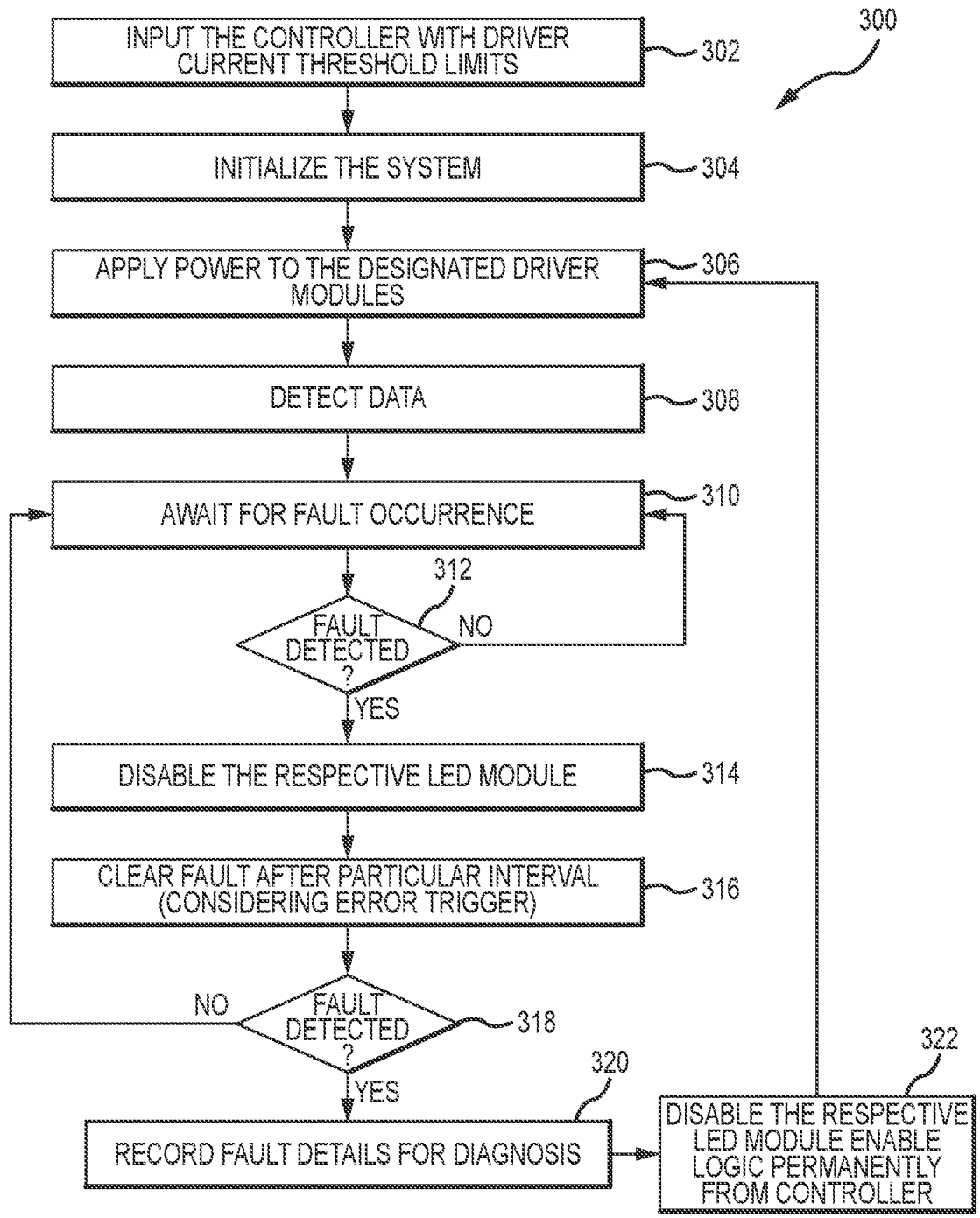
FIG. 3 is a flowchart illustrating a method for controlling inrush current in LED driver circuits and for isolating faulty LED drivers, in accordance with various embodiments.

Referring now to FIGS. 1 and 2, a block diagram illustrates a system 200 for power control of a driver of an electronic device. A circuit diagram illustrates a specific implementation of the system 200 as another system 100. The system 200 (and system 100) includes a power source 220 (120) that outputs a power signal. The system 200 (100) further includes a current control circuit 202 (102) that is designed to output a constant current signal. The system 200 (100) further includes a failsafe logic circuit 204 (104) which ensures proper operation of the system 200 (100). The system 200 (100) also includes a sensor 201 that detects an electrical value (e.g., a current or a voltage) corresponding to operation of the system 200 (100). The system 200 (100) further includes a current source selection switch 208 (108) which selectively provides current to each of a plurality of drivers 214 (114). The system 200 (100) also includes a controller 212 (112). The drivers 214 (114) may be designed to power, or drive, an electronic device such as a light emitting diode (LED). The system 200 (100) may be designed to control or manage inrush current provided to the drivers 214 at initial startup conditions.

The controller 212 (112) may include a logic device such as one or more of a central processing unit (CPU), an accelerated processing unit (APU), a digital signal processor (DSP), a field programmable gate array (FPGA), an application specific integrated circuit (ASIC), or any other device capable of implementing logic. In various embodiments, the controller 212 (112) may further include any non-transitory memory known in the art. The memory may store instructions usable by the logic device to perform operations as described herein.

The systems 100, 200 are designed to detect relatively high inrush current or an open circuit or short circuit to ground, and to interrupt such faults. The phrase "LED driver modules" denotes a plurality of loads with different input current ratings. A fault identification and corrective mechanism is incorporated to periodically, continuously, or from time to time measure the voltage drop across metal oxide semiconductor field effect transistors (MOSFETs) M1, M2, M3, M6, M8, M10, M12 and to isolate the faulty LED driver 214 from the system 100. In the event of a change in voltage drop beyond a predetermined threshold level (i.e., due to increased inrush current or a short circuit or open circuit), the controller 112 may trigger a fault control mechanism and record the failure for diagnosis purpose.

The present disclosure provides a fault protection, identification, and corrective mechanism for an LED driver and includes: the constant current source 102; the failsafe control logic circuit 104; the sensor 201; the current source selection switch 108; the selective current control drive 106; MOSFET switches, and the plurality of LED driver modules 214. Various voltage difference amplifiers are designed to operate as the sensor 201 by detecting voltage levels across MOSFETs (e.g., a voltage difference amplifier (or "drive voltage sensor") A15 is designed to detect the voltage level across MOSFET M6, and a voltage difference amplifier (or "source voltage sensor") A1 is designed to detect the voltage level across MOSFET M1). The controller 112 is designed to compare the detected voltage levels to reference or threshold voltage values that are stored in a memory of the controller 112 to indicate an increased inrush current or a short or open circuit condition.

The inrush control circuits may incorporate a current mirror (e.g., a combination of MOSFETs M4 and M5, M5 may be a P-channel metal—oxide—semiconductor (PMOS)) that is driven according to a maximum current allowed by each of LED driver 114. The current mirror may be supplied with a voltage by a regulated voltage source with 0.1 percent (0.1%) tolerance precision resistor (Rref) to provide constant current. In FIG. 1, the constant current source is controlled by the controller 112 via an NMOS switch (MOSFET M4) which saves power during normal operation of driver modules. The constant current source value can be varied by adjusting the resistance of resistor Rref via digitally controlled means. Inclusion of the variable resistor Rref may be optional. Use of the variable resistor Rref may benefit the system by automatically adjusting the current with regard to the load, or to compensate for a tolerance of electronic components (i.e., the LEDs) due to environmental disturbances. Use of the variable resistor Rref may result in more accurate driving of the LEDs.

The constant current control circuit includes the field effect transistor (PMOS) M5 and the variable sense resistor Rref. The illustrated circuit of FIG. 1 includes the P-channel MOSFET current mirror as described above. However, inclusion of the P-channel current mirror is not meant to be limiting in any way, and in fact may be replaced with an N-channel MOSFET current mirror, a bipolar transistor, or any other electronically-controlled switch without departing from the scope of the present disclosure. In addition, the present disclosure utilizes the constant current NMOS control to reduce power dissipation during steady state operation of the LED driver. The NMOS switch is implemented to provide switching action for the PMOS current mirror and vise-versa.

Further it is possible to increase the width/length (W/L) ratio of the MOSFETs (M1, M2, and M3) that are used in the constant current source 102 which increases the current gain for a given Vgate. The W/L ratio is linked to the transconductance and the current capability.

The fault protection, identification and corrective mechanism includes a constant current source 102 drive, a current source selection switch 108, a PMOS switch 106 (i.e., a selective current control drive), comparators 110, and the failsafe control logic circuit 104. The comparators 110 receive signals from the input voltage as well as an LED string voltage. Reference to these comparators are derived from the regulated voltage source (Vref). In response to the input current reaching or exceeding the operating threshold, the LED driver 114 will be set to an OFF state. The A7, A8, A9 comparators are connected in such a way that a non-inverting node is connected to Vref and an inverting node is connected to a bias voltage of the constant current source 102.

The ORing diodes D1/D6 and D2/D7 may act as a bypass element during a combinational load drive event. In particular, these diodes will act as a bypass element from a selected source to another source to drive the associated driver.

The output of the comparators 110 are fed to set of inverter (INV) gates A3, A4, and A12, to an AND gate A2, to a set/reset (SR) flip flop A20, to a NOR gate A16, and to an OR gate A5, and is then provided to the respective driver module 114. It is to be noted that a first LED driver 116 is considered to consume an equivalent current to that provided by the current source. Similarly a second LED driver 118 is considered to consume a greater amount of current than the first LED driver 116. Similarly a third and a fourth LED driver are considered to be identical and consume a same amount of current as each other, and a greater amount of current than the first and second LED drivers 116, 118.

A voltage sense signal is monitored across MOSFETs M6, M8, M10, and M12 (or "drive transistors") to detect a voltage difference in order to detect performance of the system 100. The current source enable/disable switches (W1, W2, and W3) will provide a bias voltage to MOSFETs M1, M2, and M3; the switches W1, W2, and W3 are controlled by the controller 112. Switch W1 may include a single pole double throw (SPDT) switch with a single pole terminal connected to MOSFET M1 and double throw terminals connected to Vin and the gate of MOSFET M5, respectively. The switches W2 and W3 may include similar arrangements as that of switch W1.

Figure 4:
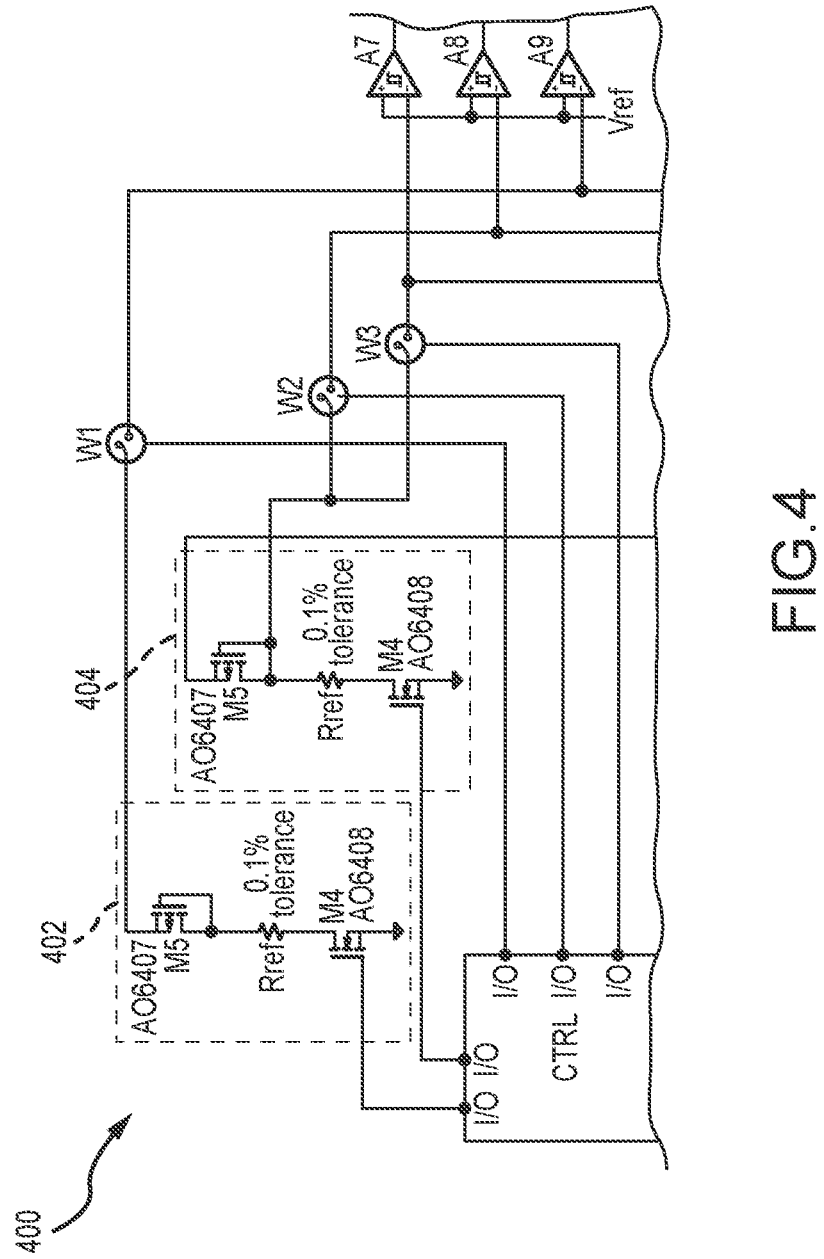
FIG. 4 is a circuit diagram which may be used as a portion of the system of FIG. 1 with multiple current sources, in accordance with various embodiments.

In a case of versatile input current for LED drivers, the system 100 may be required to have different current source in place to provide the required current. In that regard and referring to FIG. 4, a system 400 may be used as a portion of the system 100 of FIG. 1 and may include a first current source 402 designed to provide a first current and a second current source 404 designed to provide a second current. Both the first current source 402 and the second current source 404 may output a variable current value.

Returning reference to FIGS. 1A, 1B, 1C, 1D, and 2, the present disclosure illustrates that drivers may be based on a PMOS current source (MOSFETS M1, M2, and M3, also referred to as source transistors) to operate during a power-on condition to limit the current to remain equal to or less than the maximum allowed inrush current (i.e., to cause the current to remain at or below an inrush threshold current), and the MOSFET M6 switch ("drive switch" or "drive transistor") will turn-on after the specified time to provide steady state current during normal operation with reduced power dissipation between the drain and the source of the MOSFET to minimize power loss. During fault occurrences, the voltage across the PMOS MOSFETS M6, M8, M10, and M12 may increase above the threshold values, thus causing the faulty LED driver 114 to be in an open circuit configuration. The input current for any LED driver 114 driver may have any current value.

Referring specifically to FIGS. 1A, 1B, 1C, 1D, the constant current source provides the required LED drive current. The current mirror is designed in such a way to provide a bias voltage for multiple PMOS current source drivers. The LED driver modules 114 may be operated in a combinational topology, thereby allowing each driver module 114 to achieve continuous current flow from the power supply regardless of the status of other driver modules 114.

As a specific example, the first LED driver module 116 may require 60 milliamps (mA) (nominal current) and may be rated for an inrush current having 200 mA for 150 microseconds. Furthermore, the second driver module 118 may require 150 mA (nominal current) and may be rated for an inrush current of 400 mA for 200 microseconds. Also, the remaining driver modules 114 may require 350 mA (nominal current) and may be rated for an inrush current of 600 mA for 300 microseconds.

In the example, an applied voltage in (Vin) may be 28 volts (V) (for example, the voltage source may be from a DC-DC converter or from a regulated aircraft 28V power), and the Rref value may be chosen to be 140 ohms. The switches W1, W2, and W3 may receive the bias voltage for the current source drive and may be controlled by the controller 112 with an enable and a disable function. The current source drive MOSFETS M1, M2, and M3 are not limited to the specific configuration described herein, and may be extended to 'n' drives. During operation of MOSFETS M1, M2, and M3, the switches M6, M8, M10, and M12 are kept disabled state by set of logic gates A14, A5, A23, A19, A16, and A20. The proposed logic is implemented to ensure reduced power dissipation due to constant current drive. Comparators A7, A8, and A9 may be configured to output logic HIGH or LOW when switches W1, W2, and W3 enabled and disabled, respectively. If switch W1 is enabled then comparator A7 may output logic HIGH (the operation may be the same for logic gates A8 and A9).

Next, assume that the first drive module 116 is to be enabled. The controller 112 will enable switch W1 and in turn provide a bias voltage for PMOS M1. In this example, the maximum current that can be sourced by PMOS M1 may be 200 mA, and the steady state current required by the first LED driver module 116 is 60 mA and the start-up current of the first LED driver module 116 is 200 mA for 150 microseconds. The PMOS M1 is enabled for 150 microseconds and then the PMOS switch M6 is enabled during steady state operation to reduce power dissipation in MOSFET M1 and the resistance of Rref. When MOSFET M6 is enabled, the current source section is redundant and the voltage difference amplifier A15 will sense the Rds_on voltage drop across the MOSFET M6 switch. The controller 112 may then compare the detected current with a preset acceptable range to detect errors for the respective LED drive modules 114. During steady state operation, the voltage tolerance limit may be set to be approximately 60 mA plus or minus 10 percent (e.g., driver module 1 116) of a voltage corresponding to a normal current supplied from the power source to the driver module 114.

The failsafe logic gates A2, A3, A4 will provide a logic HIGH; if switch W1 is enabled, switch W2 is disabled, and switch W3 is disabled. Then, the logic gate A14 will receive an input from logic gate A2 and from the DEMUX block. The output of gate A14 is fed to an OR gate A5. Inverter logic A23 will receive the input from gate A2, and the output of gate A23 is fed to an AND gate A19. The output of the gate A19 is fed to an OR gate A5 and to a MOSFET M7. Further, a NOR gate A16 will receive input from the DEMUX and Reset (Active low). Output of NOR gate is fed to reset pin of SR flip flop A20. The set input of SR flip flop receives input from DEMUX logic. Output (Q) of SR flip flop provide input to A19.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling power provided to a first electronic device, the system comprising:
   a first driver configured to drive the electronic device and having an on state and an off state;
   a set of sensors configured to detect electrical data corresponding to electricity provided to the first driver;
   a controller configured to compare the electrical data to a threshold electrical value and to determine a fault condition in response to the electrical data being greater than or equal to the threshold electrical value and to turn the first driver to the off state in response to the controller determining the fault condition;
   a current source having a source transistor configured to output an inrush current, wherein the controller is further configured to control the source transistor to output the inrush current to the first driver for a first period of time upon enabling the first driver and to turn off the source transistor after the first period of time, the first period of time corresponding to an inrush period; and
   a drive switch having a drive transistor that is configured to output a steady state current, wherein the controller is further configured to control the drive transistor to output the steady state current after the first period of time, wherein the inrush current is greater than the steady state current.

2. The system of claim 1, further comprising a current source configured to output a constant current to the first driver.

3. The system of claim 2, wherein the current source includes a variable resistor having a resistance, and the controller is further configured to adjust the resistance of the variable resistor to control an amplitude of the constant current.

4. The system of claim 1, further comprising a second driver configured to drive a second electronic device, wherein the first electronic device and the second electronic device are configured to be driven using different current values.

5. The system of claim 1, wherein the sensor includes a source voltage sensor and the detected electrical data corresponds to a source voltage across the source transistor.

6. The system of claim 1, wherein the sensor includes a drive voltage sensor and the detected electrical data corresponds to a drive voltage across the drive transistor.

7. The system of claim 1, wherein the controller is further configured to turn off the first driver by turning off the drive transistor.

8. The system of claim 7, further comprising a flip flop coupled to the drive transistor and to the controller, wherein the controller is configured to turn off the drive transistor by transmitting at least one of a set or a reset signal to the flip flop.

9. A system for controlling power provided to an electronic device, the system comprising:
   a current source having a source transistor configured to output an inrush current;
   a drive switch having a drive transistor that is configured to output a steady state current;
   a driver configured to drive the electronic device and having an on state and an off state; and
   a controller configured to:
      control the source transistor to output the inrush current to the driver for a first period of time upon enabling the driver,
      turn off the source transistor after the first period of time, the first period of time corresponding to an inrush period, and
      control the drive transistor to output the steady state current after the first period of time, the inrush current being greater than the steady state current.

10. A method for controlling power provided to a first electronic device, the method comprising:
    detecting, by a set of sensors, first electrical data corresponding to electricity provided to a first driver that is configured to drive the first electronic device;
    determining, by a controller, a fault condition in response to the electrical data being greater than or equal to a threshold electrical value; and
    turning, by the controller, the first driver to an off state in response to determining the fault condition;
    controlling, by the controller, a source transistor to output an inrush current to the first driver for a first period of time upon enabling the first driver; and controlling, by the controller, the source transistor to cease outputting the inrush current to the first driver after the first period of time, the first period of time corresponding to an inrush period; and controlling, by the controller, a drive transistor of a drive switch to output a steady state current after the first period of time, wherein the inrush current is greater than the steady state current.

11. The method of claim 10, further comprising controlling, by the controller, a resistance of a variable resistor in a current source to adjust an amplitude of a constant current provided to the driver.

12. The method of claim 10, further comprising:

detecting, by a second sensor, second electrical data corresponding to electricity provided to a second driver that is configured to drive a second electronic device;

determining, by the controller, a second fault condition in response to the second electrical data being greater than or equal to a second threshold electrical value; and turning, by the controller, the second driver to an off state in response to determining the second fault condition, wherein the first electronic device and the second electronic device are configured to be driven using different current values.

13. The method of claim 10, wherein detecting the electrical data includes detecting, by a source voltage sensor, a source voltage across the source transistor.

14. The method of claim 10, wherein detecting the detected electrical data includes detecting, by a drive voltage sensor, a drive voltage across the drive transistor.

15. The method of claim 10, wherein turning the first driver to the off state includes turning off the drive transistor.

16. The method of claim 15, wherein turning the first driver to the off state includes transmitting, by the controller, at least one of a set or a reset signal to a flip flop coupled to the drive transistor.

* * * * *